United States Patent [19]

Michalak

[11] 4,361,182
[45] Nov. 30, 1982

[54] HEAT-TRANSFERRING ELEMENTS FOR REGENERATIVE HEAT EXCHANGE

[75] Inventor: Stanislaw Michalak, Reichshof, Fed. Rep. of Germany

[73] Assignee: L. & C. Steinmüller GmbH, Gummersbach, Fed. Rep. of Germany

[21] Appl. No.: 197,796

[22] Filed: Oct. 17, 1980

[30] Foreign Application Priority Data

Oct. 18, 1979 [DE] Fed. Rep. of Germany ....... 2942126

[51] Int. Cl.³ .............................................. F28D 21/00
[52] U.S. Cl. .......................................... 165/10; 165/8; 165/104.16; 165/104.18
[58] Field of Search ............................. 165/10, 104.14

[56] References Cited

U.S. PATENT DOCUMENTS 3,596,713  8/1971  Katz ................................ 165/104.13
3,627,036  12/1971  Gilbert ............................ 165/10 X

FOREIGN PATENT DOCUMENTS 32863  3/1979  Japan .................................... 165/10

Primary Examiner—Albert W. Davis, Jr.
Attorney, Agent, or Firm—Becker & Becker, Inc.

[57] ABSTRACT

Heat-transferring elements for regenerative heat exchange. The elements are embodied as rigid hollow spheres or balls, or as hollow polyhedrons, with the free inner space or chamber thereof being partially filled with a heat-conducting liquid as well as vapor from this liquid. The hollow sphere may be provided with an elastic outer shell with reinforcing elements arranged in the interior thereof. The heat-transferring elements may be utilized as a whirl layer and/or static layer.

2 Claims, 11 Drawing Figures

HEAT-TRANSFERRING ELEMENTS FOR REGENERATIVE HEAT EXCHANGE

The present invention relates to heat-transferring elements for regenerative heat exchange.

The present invention proceeds on the basis of known heat pipes, which are known as elements for very intensive heat exchange.

These heat pipes transfer the heat from a hot region into the cold region by means of an indirect medium, for instance water, which vaporizes at the hot end of the pipe and condenses at the cold end thereof.

The heat pipes are immovable, rigid bodies which transport the heat from a warmer chamber into a colder chamber. In many technical situations, especially with heat exchangers, between gases with high dust or powder content or contaminated fluids, crusts form on the pipe surface of the known heat pipes; these crusts are removable only with great difficulty.

It is an object of the present invention to provide heat-transferring elements which make possible a problemless and intensive heat exchange, with the cleaning thereof occurring without great costs from an apparatus standpoint.

This object, and other objects and advantages of the present invention, will appear more clearly from the following specification in connection with the accompanying drawings, in which.

The elements of the present invention are characterized primarily in that they are embodied as rigid hollow spheres or balls, or as hollow multi-surface configurations or polyhedrons, whereby the free inner space or chamber is partially filled with a heat-conducting liquid as well as vapor from this liquid.

From a heat-technical standpoint, it is necessary in particular cases to inventively embody the rigid hollow sphere or ball as an elastic element with reinforcing elements arranged in the interior thereof.

Furthermore, the inventive elements can be utilized in a fluidized whirl layer or a static layer.

In contrast to the known heat pipes, the inventive elements are movable during operation, which means the elements are cyclically transportable between the hot and the cold regions.

Heat storage in the elements occurs in the hot space or chamber by heating the wall and the liquid (inside), but also by evaporation or vaporization of a portion of the liquid.

After transporting the elements into the cold space or chamber, the heat loss occurs by cooling-off of the wall, liquid, and condensation of the vapor.

The decisive advantage of the present invention comprises that the inventive elements are easy to clean, i.e. the elements are automatically self-cleaning during use thereof as a fluidized whirl layer. The inventive elements function in a manner similar to that of the heat pipes, and have at least comparable heat-transfer values.

Figure 1:
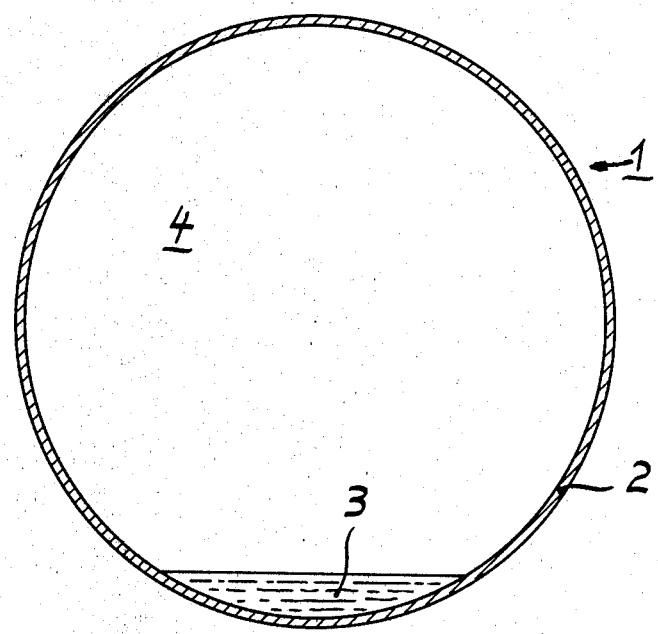
FIG. 1 illustrates the inventive element as a hollow sphere or ball.
Figure 2:
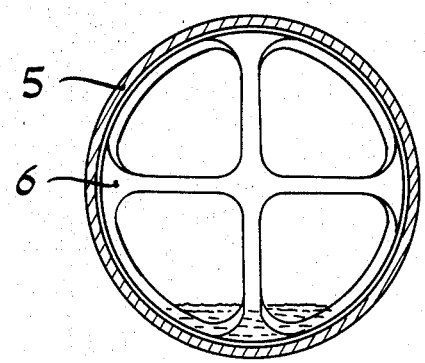
FIG. 2 illustrates the inventive element as a hollow sphere or ball with an elastic outer hull or shell at low temperature.
Figure 3:
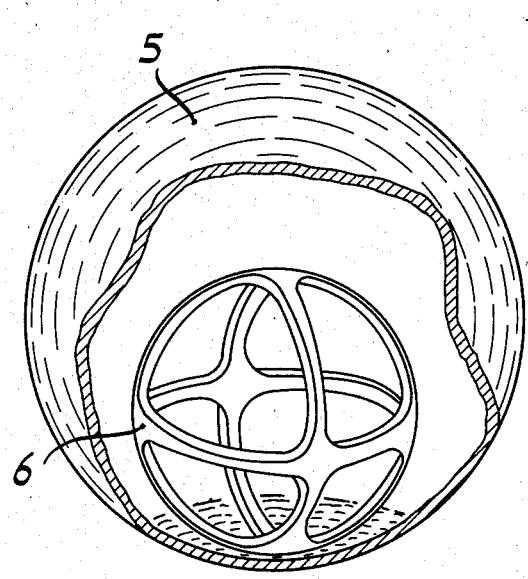
FIG. 3 illustrates the element of FIG. 2 at high temperature.

Referring now to the drawings in detail, the inventive element shown in FIG. 1 comprises a hollow sphere or ball 1 which includes a wall 2, the liquid 3, and the steam or vapor 4 which is formed from the liquid. In this connection, the liquid can comprise water, Freon, alcohols, and the like. With a rigid embodiment of the elements 1, the wall 2 may comprise metallic or non-metallic materials. FIGS. 2 and 3 show a special embodiment of the inventive element 1. In this case, the wall 2 comprises an elastic hull or shell 5 in the form of heat-resistant rubber or synthetic material. So that the individual elastic elements do not press together or compact when several layers of the elements are stacked or arranged one above the other, stiffening or reinforcing elements 6 are arranged in the interior of the spherically-shaped elements, as they are illustrated in FIGS. 2 and 3. In this connection, the elastic outer shell 5 lies or engages upon the reinforcing element 6 at low temperatures (FIG. 2), and expands correspondingly at high temperatures (FIG. 3).

Figure 4:
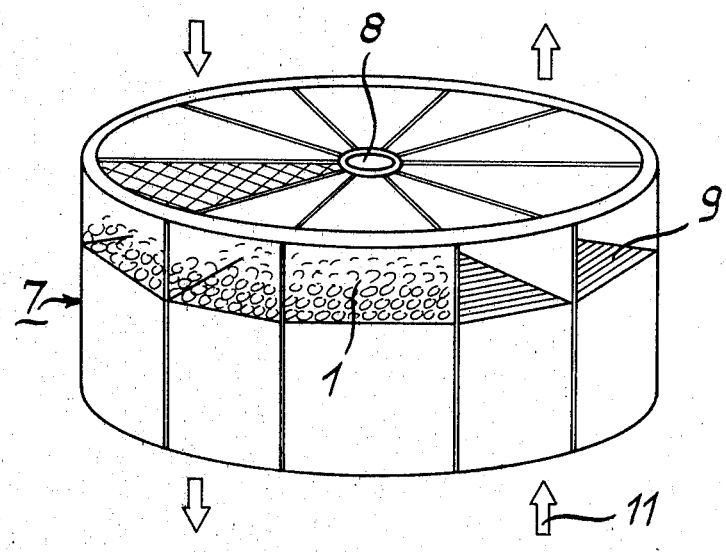
FIG. 4 illustrates an arrangement of the inventive element in a Ljungstrom heat exchanger.
Figure 5:
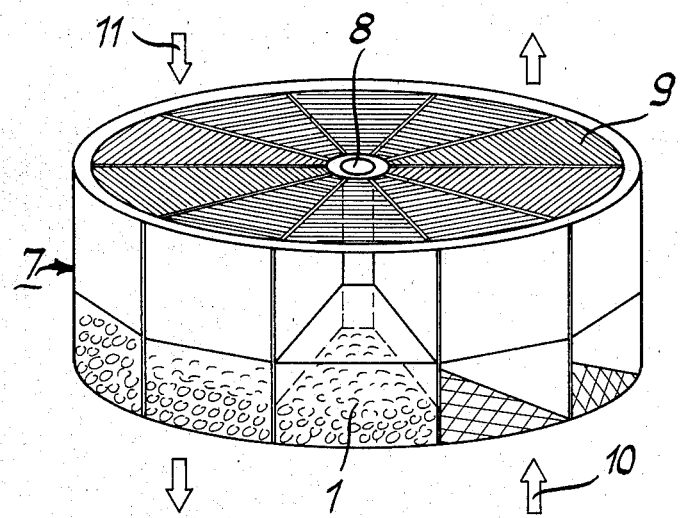
FIG. 5 shows another arrangement of the inventive element in such a heat exchanger.
Figure 6:
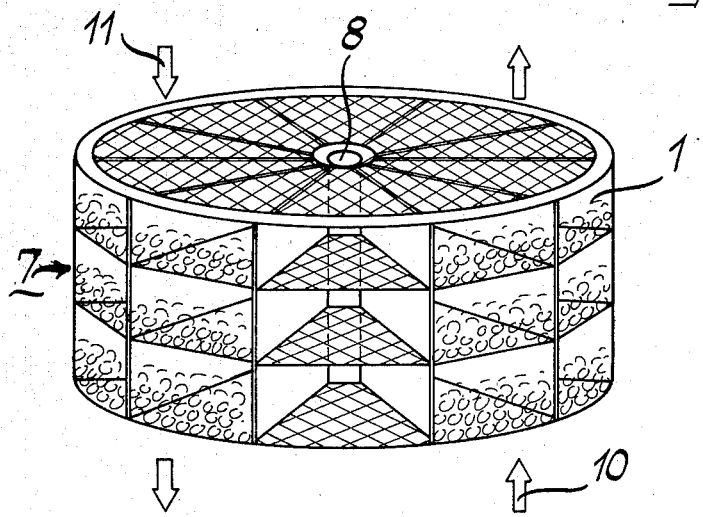
FIG. 6 illustrates still another arrangement of the inventive element in such a heat exchanger.
Figure 7:
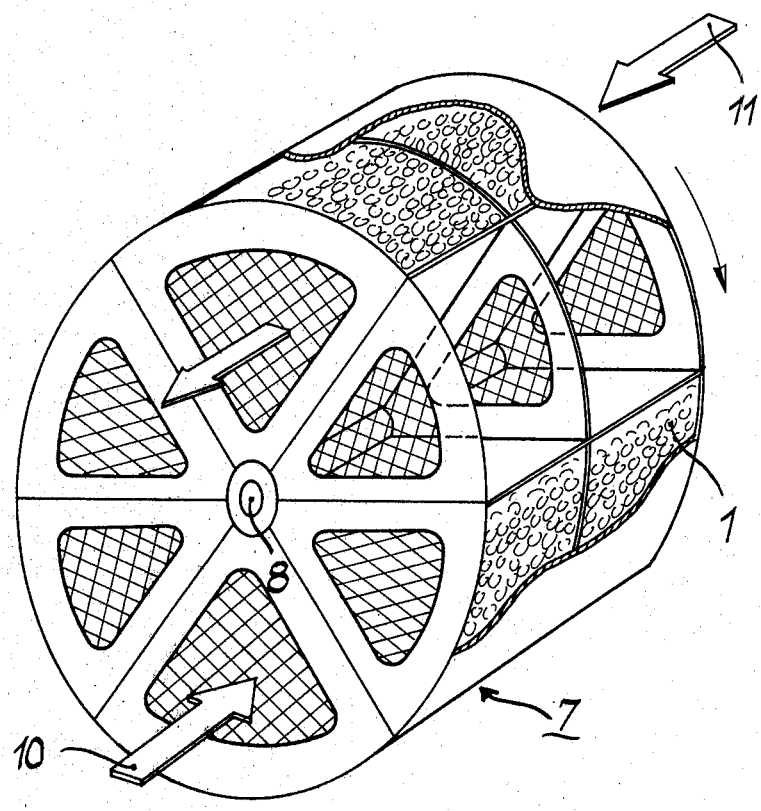
FIG. 7 illustrates a further arrangement of the inventive heat element in such a heat exchanger.

FIGS. 4, 5 and 6 show a rotor of a Ljungstrom heat exchanger 7 having a vertical axis or shaft 8. The inventive elements 1 in FIG. 4 are located above conventional storage masses 9, and in FIG. 5 the inventive elements are located below conventional storage masses 9. FIG. 6 shows a Ljungstrom heat exchanger without conventional storage masses and only with the inventive elements 1. The cold-gas inlet 10 and the hot-gas inlet 11 are also illustrated. Depending upon the direction in which flow occurs relative to the elements 1, there is formed a static layer or a fluidized whirl layer. The fluidized whirl layer forms only when the gas flow is introduced from below into the heat exchanger. When for example the shaft 8 of the rotor 7 is arranged horizontally (FIG. 7), in which connection the elements 1 are embodied as a static layer, the cleaning of the elements occurs by the rotation in the sector chamber or space without additional energy requirement for a blow-off device.

Figure 8:
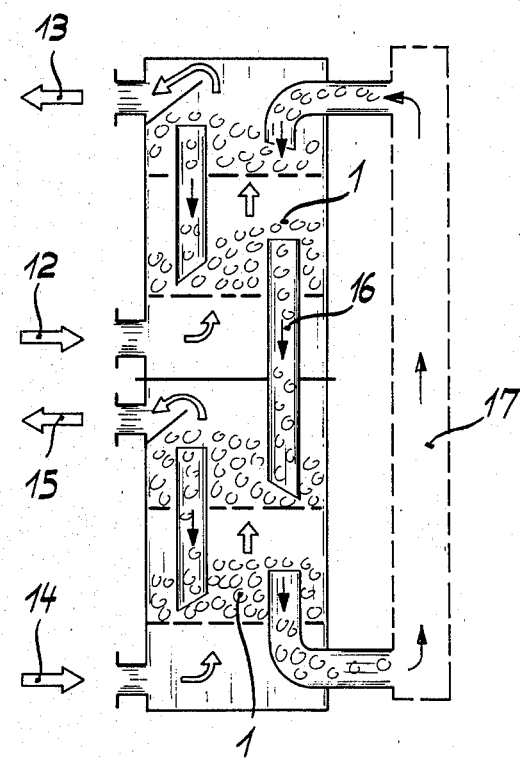
FIG. 8 illustrates the application or utilization of the inventive elements in a column heat exchanger as a fluidized whirl layer.

FIG. 8 shows a column heat exchanger with a fluidized whirl layer, with the hot gas being introduced at 12 to warm the elements 1, and being discharged again from the column at 13. The cold gas enters at 14 and leaves the column at 15. The heated elements sink downwardly through a device 16 into the lower part of the column, and are returned to the upper part of the column by a pneumatic or mechanical transporting system 17 not illustrated in greater detail.

Figure 9:
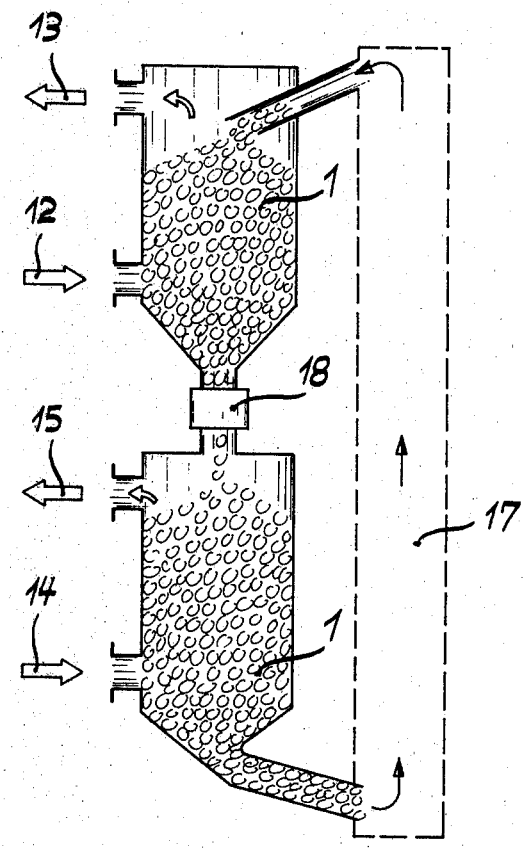
FIG. 9 shows the arrangement of the elements in a column heat exchanger as a static layer.
Figure 10:
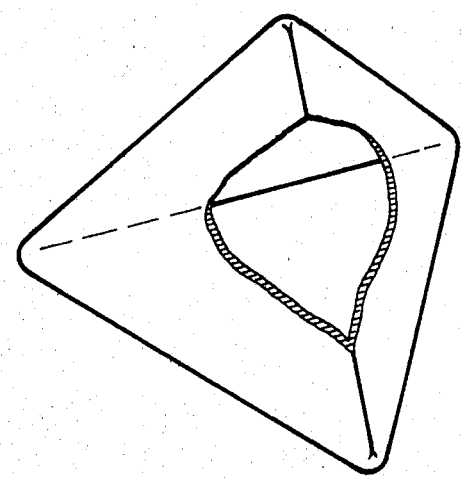
FIG. 10 shows a partially sectioned perspective view of a polyhedron hollow body.
Figure 11:
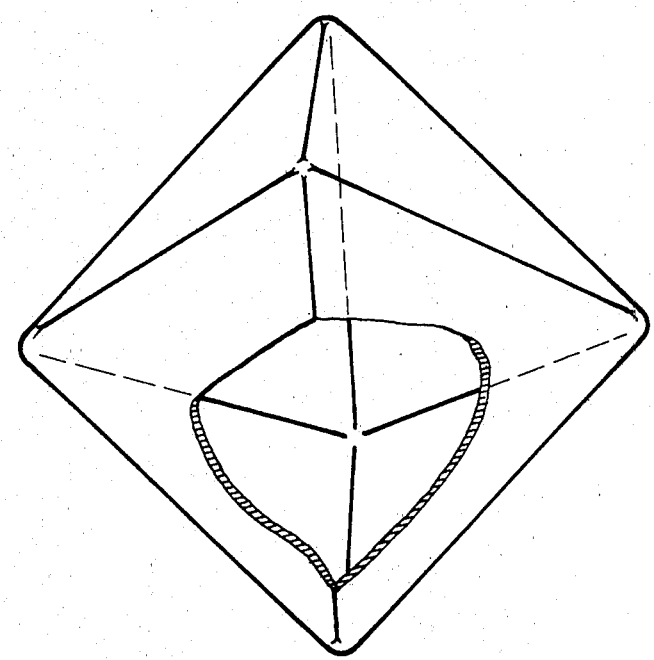
FIG. 11 shows another partially sectioned perspective view of a polyhedron hollow body.

FIG. 9 shows a heat-exchange column with a static layer, with the heated elements 1 passing into the lower part of the column in a proportioned manner, for instance by means of a rotary trap 18, where they heat the cold gas and from where they are returned to the upper part of the column by the transporting system 17.

The present invention is, of course, in no way restricted to the specific disclosure of the specification and drawings, but also encompasses any modifications within the scope of the appended claims.

What I claim is:

1. A heat transferring element for regenerative heat exchange, said element being embodied as a hollow body having a free inner space which is partially filled with a heat-conducting liquid as well as vapor from said liquid, said hollow body having an elastic outer shell and a reinforcing element arranged in said inner space.

2. A heat-transferring element according to claim 1, in which said hollow body is a polyhedron.